United States Patent
Derungs

(10) Patent No.: US 8,587,301 B2
(45) Date of Patent: Nov. 19, 2013

(54) METHOD FOR OPERATING A METAL DETECTION SYSTEM AND METAL DETECTION SYSTEM

(75) Inventor: Max Derungs, Bolton (GB)

(73) Assignee: Mettler-Toledo Safeline Limited, Manchester (GB)

(*) Notice: Subject to any disclaimer, the term of this patent is extended or adjusted under 35 U.S.C. 154(b) by 168 days.

(21) Appl. No.: 13/239,212

(22) Filed: Sep. 21, 2011

(65) Prior Publication Data

US 2012/0206138 A1 Aug. 16, 2012

(30) Foreign Application Priority Data

Oct. 7, 2010 (EP) .................................. 10186895

(51) Int. Cl.
*G01R 33/02* (2006.01)
*G01R 33/00* (2006.01)

(52) U.S. Cl.
USPC ........................... 324/258; 324/260; 324/200

(58) Field of Classification Search
None
See application file for complete search history.

(56) References Cited

U.S. PATENT DOCUMENTS

| | | | |
|---|---|---|---|
| 2,598,252 A | 5/1952 | Gossick | |
| 3,617,866 A | 11/1971 | Dowsett et al. | |
| 3,721,821 A | 3/1973 | Blanyer | |
| 3,758,849 A | 9/1973 | Susman et al. | |
| 3,896,608 A | 7/1975 | Garrott | |
| 4,176,555 A | 12/1979 | Dorman | |
| 4,263,551 A | 4/1981 | Gregory et al. | |
| 4,300,097 A | 11/1981 | Turner | |
| 4,451,812 A | 5/1984 | Vescovi et al. | |
| 4,563,644 A | 1/1986 | Lenander et al. | |
| 4,800,477 A | 1/1989 | Esposito | |
| 4,837,511 A | 6/1989 | Whittington et al. | |
| 4,843,324 A | 6/1989 | Humphreys, Jr. et al. | |
| 4,965,522 A | 10/1990 | Hazen et al. | |

(Continued)

FOREIGN PATENT DOCUMENTS

| | | |
|---|---|---|
| DE | 3406736 A1 | 8/1985 |
| DE | 3713363 A1 | 11/1988 |

(Continued)

OTHER PUBLICATIONS

Abbas, H.J. et al., The detection and location of foreign metal objects in conveyed products, Trans Inst M C., April-June 1986, pp. 76-84, 8(2).

(Continued)

*Primary Examiner* — Jermele M Hollington
*Assistant Examiner* — Trung Nguyen
(74) *Attorney, Agent, or Firm* — Standley Law Group LLP

(57) ABSTRACT

A method for operating a metal detection system that comprises a balanced coil system. One embodiment of the method comprises: determining the phase and magnitude of related signals at least for a first metal contaminant for at least two transmitter frequencies and for at least two particle sizes of the first metal contaminant; determining the phase and magnitude of the related signal for a specific product for the at least two transmitter frequencies; comparing information established at least for the first metal contaminant and the information established for the product; determining a transmitter frequency with which signal components of smallest sized particles of the at least first metal contaminant differ sufficiently or most in phase and amplitude from the phase and amplitude of the product signal; and selecting the transmitter frequency for measuring the product. A metal detection apparatus adapted to operate according to an exemplary method is also provided.

22 Claims, 4 Drawing Sheets

(56) References Cited

U.S. PATENT DOCUMENTS

| | | | |
|---|---|---|---|
| 5,003,271 A | 3/1991 | Swanson | |
| 5,034,689 A | 7/1991 | Inoue et al. | |
| 5,068,612 A | 11/1991 | Auslander et al. | |
| 5,264,733 A | 11/1993 | Tigges | |
| 5,304,927 A | 4/1994 | Thomas et al. | |
| 5,345,160 A | 9/1994 | Corniere | |
| 5,386,182 A | 1/1995 | Nikami | |
| 5,572,121 A | 11/1996 | Beswick | |
| 5,642,050 A | 6/1997 | Shoemaker | |
| 5,650,726 A | 7/1997 | Gasnier et al. | |
| 5,729,143 A | 3/1998 | Tavernetti et al. | |
| RE35,806 E | 5/1998 | Rossi et al. | |
| 5,859,533 A | 1/1999 | Gasnier et al. | |
| 5,929,634 A | 7/1999 | Artinger | |
| 5,969,528 A | 10/1999 | Weaver | |
| 5,994,897 A | 11/1999 | King | |
| 6,037,870 A | 3/2000 | Alessandro | |
| 6,094,079 A | 7/2000 | Boggs et al. | |
| 6,118,337 A | 9/2000 | Schweighofer | |
| 6,130,489 A | 10/2000 | Heimlicher | |
| 6,157,190 A | 12/2000 | Nagaishi et al. | |
| 6,177,792 B1 | 1/2001 | Govari et al. | |
| 6,236,200 B1 | 5/2001 | Nekado et al. | |
| 6,337,566 B1 | 1/2002 | Fujisaki et al. | |
| 6,420,866 B1 | 7/2002 | Goldberg et al. | |
| 6,437,573 B1 | 8/2002 | Golder et al. | |
| 6,724,191 B1 | 4/2004 | Larsen | |
| 6,958,603 B2 | 10/2005 | Kondo | |
| 7,102,347 B2 * | 9/2006 | Kondo | 324/239 |
| 7,663,361 B2 * | 2/2010 | Nishio et al. | 324/239 |
| 2002/0093338 A1 | 7/2002 | Rowan | |
| 2003/0117270 A1 | 6/2003 | Dimmer et al. | |
| 2003/0141866 A1 | 7/2003 | Johnson et al. | |
| 2003/0164766 A1 | 9/2003 | Britton | |
| 2004/0046550 A1 | 3/2004 | Kondo | |
| 2005/0104594 A1 | 5/2005 | Nelson et al. | |
| 2006/0006872 A1 | 1/2006 | Nelson | |
| 2006/0226833 A1 | 10/2006 | Kubotera et al. | |

FOREIGN PATENT DOCUMENTS

| | | |
|---|---|---|
| DE | 4424058 C1 | 10/1995 |
| DE | 202004011073 U1 | 11/2004 |
| EP | 0124042 A2 | 11/1984 |
| EP | 0215244 A2 | 3/1987 |
| EP | 0281014 A2 | 9/1988 |
| EP | 0368762 A2 | 5/1990 |
| EP | 0369954 A1 | 5/1990 |
| EP | 0379804 A2 | 8/1990 |
| EP | 0780704 A2 | 6/1997 |
| EP | 0782012 A2 | 7/1997 |
| EP | 1202077 A2 | 5/2002 |
| EP | 1502544 A1 | 2/2005 |
| GB | 400041 | 1/1933 |
| GB | 528568 | 2/1939 |
| GB | 677773 | 8/1952 |
| GB | 776163 | 6/1957 |
| GB | 819893 | 9/1959 |
| GB | 1436900 | 5/1976 |
| GB | 2004069 A | 3/1979 |
| GB | 2025630 A | 1/1980 |
| GB | 2026169 A | 1/1980 |
| GB | 1603578 | 11/1981 |
| GB | 2204133 A | 11/1988 |
| GB | 2372329 A | 8/2002 |
| GB | 2423366 A | 8/2006 |
| GB | 2462212 A | 2/2010 |
| JP | 53-142260 A | 12/1978 |
| JP | 57-133373 A | 8/1982 |
| JP | 57-187649 A | 11/1982 |
| JP | 57-187650 A | 11/1982 |
| JP | 59-40287 A | 3/1984 |
| JP | 59-48673 A | 3/1984 |
| JP | 59-60274 A | 4/1984 |
| JP | 59-60277 A | 4/1984 |
| JP | 60-178318 A | 9/1985 |
| JP | 60-225084 A | 11/1985 |
| JP | 1-176972 A | 7/1989 |
| JP | 3-218490 A | 9/1991 |
| JP | 9-80162 A | 3/1997 |
| JP | 10-111363 A | 4/1998 |
| JP | 11-337656 A | 12/1999 |
| JP | 2000-56032 A | 2/2000 |
| JP | 2001-91661 A | 4/2001 |
| JP | 2001-91663 A | 4/2001 |
| JP | 2002-168965 A | 6/2002 |
| JP | 2002-333485 A | 11/2002 |
| JP | 2004-205319 A | 7/2004 |
| JP | 2004-251712 A | 9/2004 |
| WO | 87/04801 A1 | 8/1987 |
| WO | 88/03273 A1 | 5/1988 |
| WO | 97/36143 A1 | 10/1997 |
| WO | 02/25318 A1 | 3/2002 |
| WO | 2006/087510 A1 | 8/2006 |
| WO | 2008/006178 A1 | 1/2008 |

OTHER PUBLICATIONS

Asakawa, K. et al., Metal Detector for Tracing Submarine Telecommunication Cables, IEEE Transactions on Instrumentation and Measurement, Dec. 1983, pp. 477-483, IM-32(4).

Dairy Foods, Buyers Mart: Plant Equipment, web pages from www.dairyfoods.com, 2010, 6 pp., BNP Media.

Brown, J., Brief H-Bridge Theory of Operation, Tutorials, 2011, 4 pages, Dallas Personal Robotics Group.

CEIA, Industrial Metal Detector THS, Oct. 31, 2000, 96 pages, CEIA S.p.A., Italy.

CEIA, Industrial Metal Detector THS, Dec. 5, 2001, 97 pages, CEIA S.p.A., Italy.

CEIA, Industrial Metal Detector, Apr. 2002, 40 pages, CEIA S.p.A., Italy.

Cintex Ltd., Foodex Meatex 2004, Entrepreneur Food Trade Review, Feb. 2004, 2 pages, Food Trade Press Ltd. And Gale Group.

Dairy Field, Variable-frequency metal detector, web pages from www.allbusiness.com, Jan. 1, 2005, 2 pages, AllBusiness.com, Inc.

Flind, A., Magnum Metal Locator, Practical Electronics, 1980, pp. 1-11, Wimbourne Publishing.

Flind, A., Magnum Metal Locator Part 3, Practical Electronics, 1981, pp. 1-22, Wimbourne Publishing.

Funkschau, Metallsuchgerate, Funkschau, Jul. 10, 1981, pp. 50-54, 14.

Gray, J., Development of an advanced industrial metal detector instrumentation, Computing & Control Engineering Journal, Jun. 1994, pp. 117-120, 5(3).

Hamo, D.J., A 50W, 500kHz, Full-Bridge, Phase-Shift, ZVS Isolated DC to DC Converter Using the HIP4081A, Intersil Intelligent Power, Apr. 1995, pp. 1-16, AN9506.

Loma Systems, Inc., Loma Launches Cintex Brand Sentry VF, First-Ever, Variable Frequency Metal Detector, web page from www.beverageonline.com, Nov. 16, 2004, 1 page, VertMarkets, Inc.

Nelson, C.V. et al., Wide Bandwidth Time-Domain Electromagnetic Sensor for Metal Target Classification, IEEE Transactions on Geoscience and Remote Sensing, Jun. 2001, pp. 1129-1138, 39(6).

Heat and Control, CEIA THS/3F Metal Detector Product Information Sheet, web page from www.heatandcontrol.com, 2006, 1 page, Heat and Control, Inc.

Wattagnet.Com, Mettler-Toledo Safeline Profile metal detection systems, web pages from www.wattagnet.com, printed Feb. 23, 2011, 2 pages.

Packworld.Com, Cintex Sentry VF variable frequency metal detector, web page from www.packworld.com, Nov. 2004, 1 page.

Brand protection looks to Tailored solutions from inspection systems, Machinery Update, Mar./Apr. 2004, pp. 85-90.

Kittel, C.F. et al., Metal Detector, U.S. Patent Appl. No. 11/883,950, international filing date Jan. 9, 2006, 49 pages.

\* cited by examiner

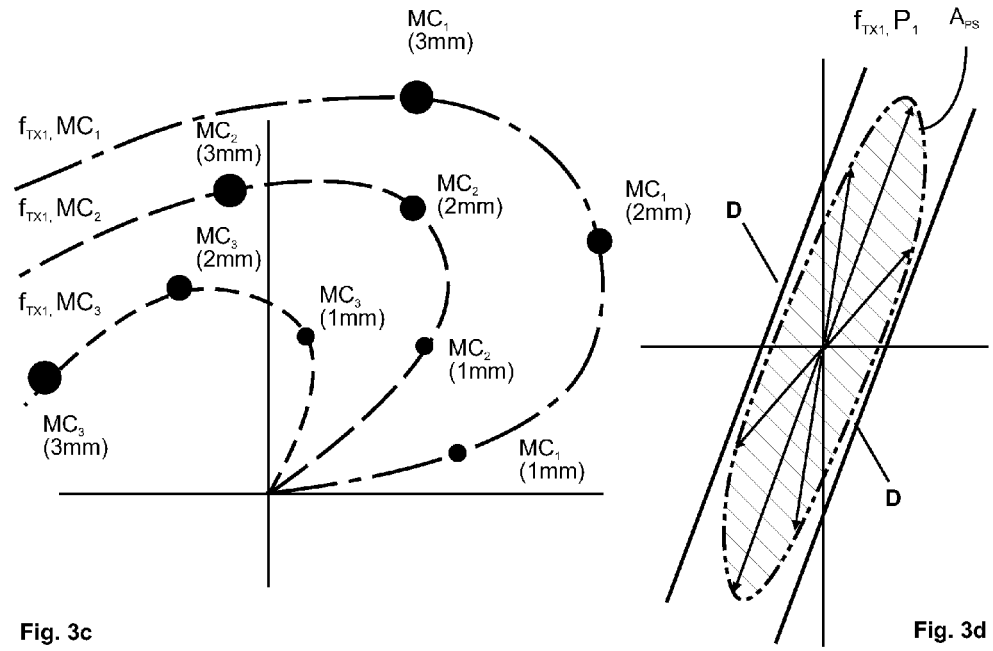
Fig. 3c
Fig. 3d
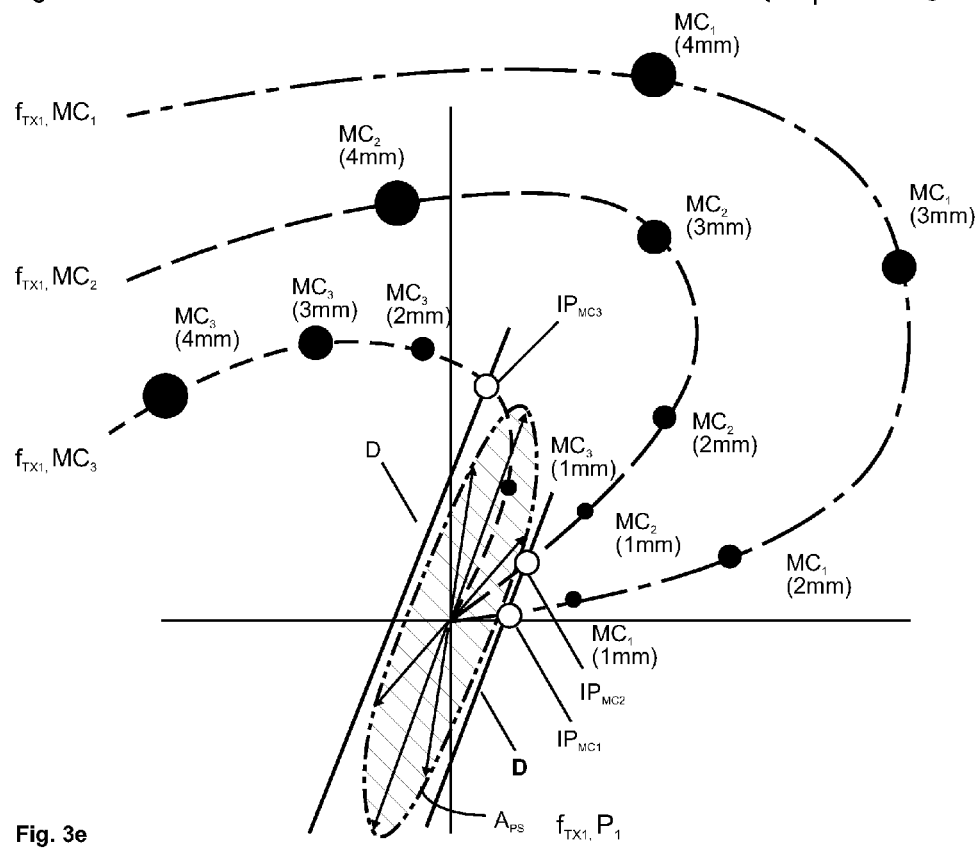
Fig. 3e

METHOD FOR OPERATING A METAL DETECTION SYSTEM AND METAL DETECTION SYSTEM

This application claims priority under 35 U.S.C. §119 to European Patent Application No. 10186895.8, filed Oct. 7, 2010, which is hereby incorporated by reference in its entirety.

BACKGROUND AND SUMMARY OF THE INVENTION

Exemplary embodiments of the present invention relate to a method for operating a metal detection system that uses at least two operating frequencies and to a metal detection system that implements this method.

An industrial metal detection system may be used to detect and reject unwanted metal contamination. When properly installed and operated, it will help reduce metal contamination and improve food safety. Most modern metal detectors utilize a search head comprising a "balanced coil system." Detectors of this design may be capable of detecting all metal contaminant types including ferrous, nonferrous, and stainless steels in a large variety of products such as fresh and frozen products.

A metal detection system that operates according to the "balanced coil" principle typically comprises three coils that are wound onto a non-metallic frame, each exactly parallel with the other. The transmitter coil located in the center is energized with a high frequency electric current that generates a magnetic field. The two coils on each side of the transmitter coil act as receiver coils. Since the two receiver coils are identical and installed with same distance from the transmitter coil, an identical voltage is induced in each of them. In order to receive an output signal that is zero when the system is in balance, the first receiver coil is connected in series with the second receiver coil having an inverse winding. Hence the voltages induced in the receiver coils, that are of identical amplitude and inverse polarity, cancel out one another in the event that the system, in the absence of metal contamination, is in balance.

As a particle of metal passes through the coil arrangement, the high frequency field is disturbed first near one receiver coil and then near the other receiver coil. While the particle of metal is conveyed through the receiver coils, the voltage induced in each receiver coil is changed (by nano-volts). This change in balance results in a signal at the output of the receiver coils that may be processed, amplified, and subsequently be used to detect the presence of the metal contamination.

The signal processing channels split the received signal into two separate components that are 90° apart from one another. The resultant vector has a magnitude and a phase angle, which is typical for the products and the contaminants that are conveyed through the coils. In order to identify a metal contaminant, "product effects" need to be removed or reduced. If the phase of the product is known, then the corresponding signal vector may be reduced. Eliminating unwanted signals from the signal spectrum thus leads to higher sensitivity for signals originating from contaminants.

Methods applied for eliminating unwanted signals from the signal spectrum therefore exploit the fact that the contaminants, the product, and other disturbances have different influences on the magnetic field so that the resulting signals differ in phase.

The signals caused by various metals or products, as they pass through the coils of the metal detection system, may be split into two components, namely resistive and reactive components, according to the conductivity and magnetic permeability of the measured object. For example, the signal caused by ferrite is primarily reactive, while the signal from stainless steel is primarily resistive. Products that are conductive typically cause signals with a strong resistive component.

Distinguishing between the phases of the signal components of different origin by means of a phase detector allows obtaining information about the product and the contaminants. A phase detector, e.g., a frequency mixer or analog multiplier circuit, generates a voltage signal that represents the difference in phase between the signal input, such as the signal from the receiver coils, and a reference signal provided by the transmitter unit to the receiver unit. Hence, by selecting the phase of the reference signal to coincide with the phase of the product signal component, a phase difference and a corresponding product signal is obtained at the output of the phase detector that is zero. In the event that the phase of the signal components that originate from the contaminants differ from the phase of the product signal component, then the signal components of the contaminants may be detected. However in the event that the phase of the signal components of the contaminants is close to the phase of the product signal component, then the detection of contaminants fails, since the signal components of the contaminants are suppressed together with the product signal component.

In known systems, the transmitter frequency is therefore selectable in such a way that the phase of the signal components of the metal contaminants will be out of phase with the product signal component.

GB2423366A discloses an apparatus that is arranged to switch between at least two different operating frequencies such that any metal particle in a product will be subject to scanning at different frequencies. The frequency of operation is rapidly changed so that any metal particle passing through on a conveyor belt will be scanned at two or more different frequencies. In the event that for a first operating frequency the signal component caused by a metal particle is close to the phase of the signal component of the product and thus masked, then it is assumed that for a second frequency, the phase of the signal component caused by the metal particle will differ from the phase of the signal component of the product so that the signal components may be distinguished. By switching between many frequencies, it is expected that one frequency will provide a suitable sensitivity for any particular metal type, size, and orientation. U.S. Pat. No. 5,994,897A may operate in a similar manner.

Looking at these methods from a different angle, it may be stated that for one optimal frequency setting numerous other frequency settings have been applied, disclosing that this method requires considerable efforts. Various frequency settings need to be applied when measuring a single product. This means that for the frequency setting that provides the best result, only a small measurement period is available. Consequently, the result of the measurement will not be optimal. Furthermore, since the measurement is performed for all selected frequency settings, the major part of the data, which is processed with considerable efforts, will be disregarded. Hence, this method, which requires considerable efforts in the signal processing stages, is characterized by a relatively low efficiency.

Moreover, such metal detection systems that operate at different frequencies typically have a low sensitivity. Hence, although signals of metal contaminants may be obtained with a desirable phase, the detection of these signals may still fail due to the low sensitivity of such metal detection systems.

Also known in the art are metal detectors such as described in U.S. Pat. No. 6,724,191 B1, to Larsen, which discloses various circuits including an H-bridge switch network and a pulse width modulated switched capacitor resonator, for simultaneously resonating at several frequencies.

Similar to GB2423366A, GB2462212B refers to metal detectors that contain a drive circuit comprising four switches arranged as a full bridge circuit, wherein the coil system is connected across the output of the bridge. A programmable logic device controls the switches via a plurality of drive maps stored in the programmable logic device, with each drive map containing a switching sequence for a respective predetermined frequency of operation.

U.S. Pat. No. 5,859,533 to Gasnier describes an electromagnetic tomographic emitter for operating at variable frequencies to detect subsurface characteristics.

U.S. Pat. No. 5,304,927 discloses a method and apparatus for detection of metal in food products as packages of said food products are passed through the detector on a conveyor.

Exemplary embodiments of the present invention are therefore based on providing an improved method for operating a metal detection system that uses at least two operating frequencies as well as on providing a metal detection system adapted to operate according to this method.

Particularly, an exemplary embodiment of the present invention is based on providing a method that allows the detection of contaminants, particularly metal contaminants, with reduced efforts and a high efficiency.

Further, an exemplary embodiment of the present invention is based on providing a method that allows detecting small sized metal contaminants with higher sensitivity.

Still further, an exemplary embodiment of the present invention is based on providing a method that provides information about the capability of the metal detection system that may advantageously be used for the automatic configuration of the system.

An exemplary embodiment of the method serves for advantageously operating a metal detection system that comprises a balanced coil system including a transmitter coil that is connected to a transmitter unit, which provides transmitter signals with a selectable transmitter frequency, and a first and a second receiver coil that provide output signals to a receiver unit, which compensate one another in the event that the metal detection system is in balance and, in the event that product is present in the balanced coil system, provide an output signal that is forwarded to a signal processing unit, which suppresses at least the components of the product signal and delivers the signal components caused by metal contaminant contained in the product.

An example of the method comprises the steps of: determining the phase and magnitude of the related signals at least for a first metal contaminant for at least two transmitter frequencies and for at least two particle sizes of the first metal contaminant; determining the phase and magnitude of the related signal for a specific product for the at least two transmitter frequencies; comparing the information established for the at least first metal contaminant and the information established for the product; determining at least one preferable transmitter frequency with which the signal components of smallest sized particles of the at least first contaminant differ most in phase and amplitude from the phase and amplitude of the product signal; and selecting the preferable transmitter frequency for measuring the specific product.

An exemplary embodiment of the method may therefore allow obtaining optimal transmitter frequencies with which the smallest possible particles of one or more metal contaminant types may be detected. Accordingly, an example of a metal detection system may optimally be configured for any measurement, involving products of any consistency and any potential metal contaminant type.

In an exemplary embodiment, measuring a product at unsuitable transmitter frequencies and analyzing the related data may be avoided. One exemplary embodiment of the method may always apply the optimal frequencies so that measurements are performed with reduced efforts and high efficiency. For example, since measurements are not performed at unsuitable transmitter frequencies, the time available for measuring a product, i.e., for detecting metal contaminants in a product, is dedicated to the application of one or more optimal transmitter frequencies. As a result, more measurement data of high-quality is available for an individual metal contaminant. In an exemplary embodiment, this consequently leads to a significant improvement of the sensitivity of the metal detection system for all products and metal contaminant types measured. Optimal transmitter frequencies may therefore be determined for all metal contaminant types that may occur in a product and for all available products for all transmitter frequencies that may be selected.

In an exemplary embodiment, at least two curves of a first array at least for a first metal contaminant are established. Each curve is established for a separate transmitter frequency representing the phase and magnitude of the signal for a progressively increasing particle size of the first metal contaminant. Hence, a curve or response locus may be established at least for the first metal contaminant for at least two separate transmitter frequencies that are used as fixed parameters and with the particle size as a variable parameter. Each curve established for a specific transmitter frequency may be part of a first array that relates to the first metal contaminant. For each metal contaminant, a first array with at least two curves may be established.

The information established at least for the first metal contaminant and the information established for the product for at least a first and second transmitter frequency may then be compared in order to determine the preferred transmitter frequency, for which the signal components of smallest sized contaminant particles differ most in phase and amplitude from the phase and amplitude of the product signal.

In the event that information has been gathered for each transmitter frequency for more than one metal contaminant, then the complete information established for all metal contaminant types for a first and second transmitter frequency may be compared with the information of the product established for this first and second transmitter frequency.

For this purpose in an exemplary embodiment, for each transmitter frequency a second array may be built with curves of different metal contaminant types recorded with the same transmitter frequency. Then for a specific transmitter frequency a superposition of a second array and the product information may be arranged, which allows determining which parts of the curves lie within or outside of the area or range of the product signals. In an example, parts of the curves that lie outside the range of the product signals indicate particle sizes of the metal contaminant, which may not be masked or suppressed together with the product signals.

Hence, an exemplary embodiment of the method and the metal detection system may not only allow determining the optimal transmitter frequency of a metal contaminant but also allow determining the minimum particle sizes of the metal contaminant types that may be detected. This valuable information may be used for configuring an example of the metal detection system to operate most efficiently.

For instance, an operator may input the metal contaminant type that shall be detected. Based on this information provided by the operator, a computer system/program implemented in the metal detection system may often find a transmitter frequency that is suitable for the detection of two or more metal contaminant types. During the measurement process, an exemplary embodiment of the metal detection system may therefore be configured and operated with one of at least two transmitter frequencies that preferably meets all requirements set by the operator.

In the event that a single transmitter frequency does not satisfy the requirements of the operator, then the computer system/program may select two or more transmitter frequencies that are optimal for individual metal contaminant types and that are applied during the measurement of the product. The selected frequencies may then be applied according to a suitable method. The selected transmitter frequencies may be applied alternately or simultaneously, e.g., as a mixture of the selected transmitter frequencies, which may be filtered accordingly in the receiver stage.

Hence, in an exemplary embodiment, only optimal transmitter frequencies may be applied that allow measurement of metal contaminants for the maximum available time so that contaminants may be detected with the highest possible sensitivity.

In an exemplary embodiment, the operating system/program may be designed in such a way that the operator may input the minimum particle sizes for the metal contaminant types that shall be detected. This allows the operating system/program to select a transmitter frequency that is suitable for two or more contaminant types, for which the specified particle size may be detected.

In an exemplary embodiment, the required information for the metal contaminant types and the product may be gathered in various ways. For example, information may be pre-stored and downloaded. Alternatively, a calibration process may be performed for the product and the metal contaminant types, in which, e.g., a product and metal contaminants of at least one particle size may be measured.

Product information may be obtained when scanning a product, for which various signal components typically occur that have an individual phase and magnitude. For example, connecting the vectors of all signal components may lead to an envelope that is the boundary of an area of the product signals or the product signature that may be suppressed by a signal discriminator, e.g., a signal processor that is programmed to suppress the components of the product signal. In an exemplary embodiment, the area, in which signals of the product and contaminants are suppressed, may be closely adapted to the product signature but typically slightly larger, so that a safety margin may be provided. The product signature may change from transmitter frequency to transmitter frequency. For a general product, an algorithm, based on empirical data, may allow establishment of the product information preferably based on only one measurement performed at a single transmitter frequency in one exemplary embodiment.

In an exemplary embodiment during a setup period in the factory or before the start of a measurement process, data of metal contaminant types may be gathered by measuring metal particles with at least one particle size. Preferably, in one exemplary embodiment, only one or a few points of the curve may be measured, while the remaining part of the curve may be obtained by applying empirical data that is typical for that metal contaminant. In other exemplary embodiments, mathematical models or formulas may be used to establish the curves (e.g., by extrapolation) and/or sections between two measured points may be interpolated. In this way, an example of the calibration of an exemplary embodiment of a metal detection system may require only a few or other limited number of measurements that provide at least the starting points of the curves or first and/or second arrays.

In one exemplary embodiment, the gathered information is preferably stored in a memory of the control unit or a computer system that is attached to or integrated into the metal detection system. The information stored may then selectively be downloaded and used for the future calibration and configuration of the metal detection system.

In addition to the novel features and advantages mentioned above, other benefits will be readily apparent from the following descriptions of the drawings and exemplary embodiments.

BRIEF DESCRIPTION OF THE DRAWINGS

FIG. 3c shows an example of a second array of curves established for three different metal contaminant types $MC_1$, $MC_2$, $MC_3$ for one transmitter frequency $f_{TX1}$.

FIG. 3d shows an example of an area $A_{PS}$ of the product signals for a scanned product with signal vectors of different phases and amplitudes that define the envelope of the area $A_{PS}$ of the product signals and discriminator lines D that delimit the area $A_{PS}$ of the product signals, that will be suppressed.

FIG. 3e shows an example of a superposition of the second array of curves shown in FIG. 3c and the area $A_{PS}$ of the product signals shown in FIG. 3d.

DETAILED DESCRIPTION OF EXEMPLARY EMBODIMENT(S)

Figure 1:
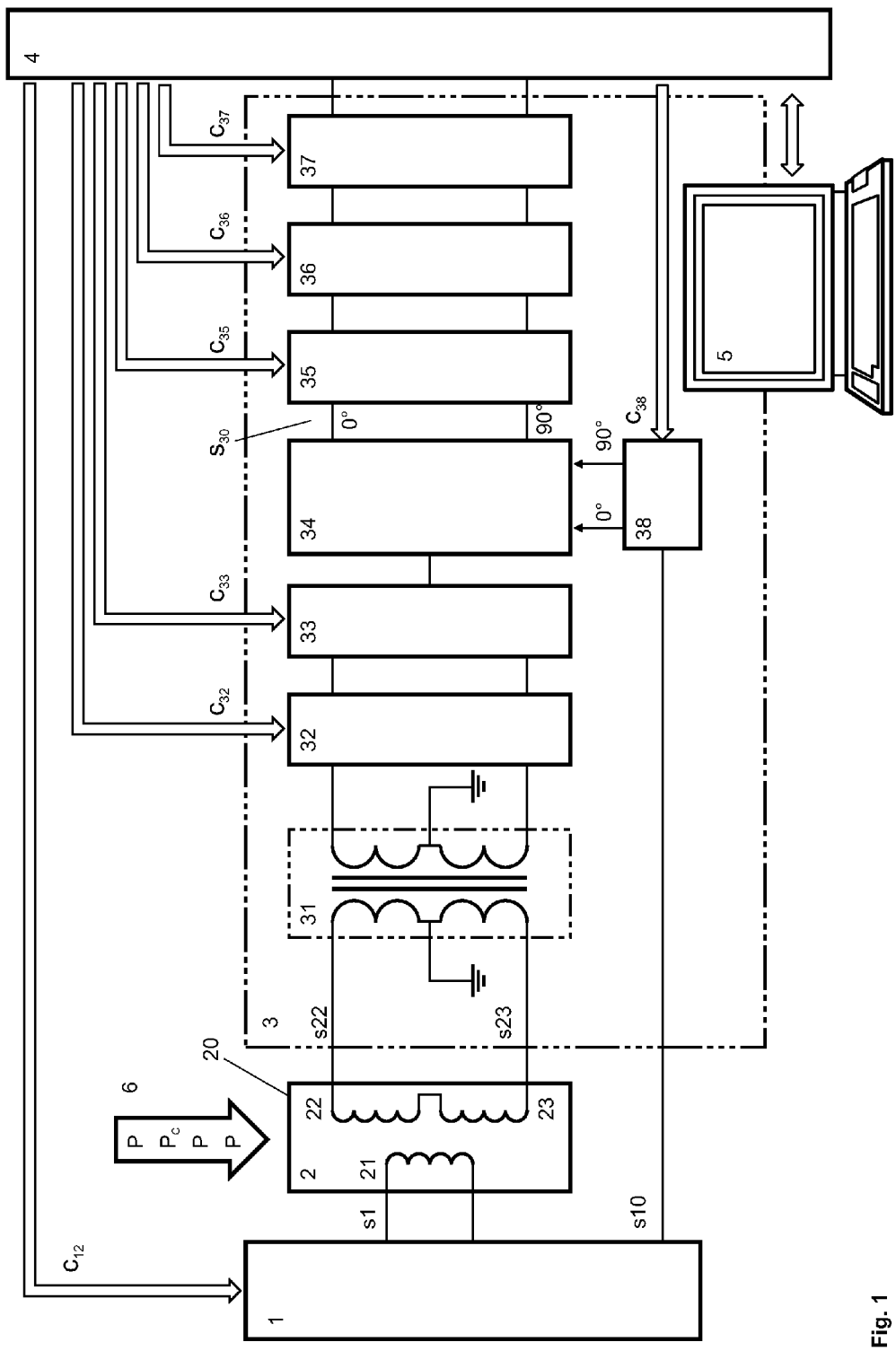
FIG. 1 shows a block diagram of an exemplary embodiment of a metal detection system.

FIG. 1 shows a block diagram of an exemplary embodiment of a metal detection system, which comprises a transmitter unit 1, a balanced coil system 2 with a transmitter coil 21 and a first and a second receiver coil 22, 23, a receiver unit 3, a signal processing unit 4, and a control unit 5 that comprises standard interfaces, input devices, and output devices, particularly a monitor. FIG. 1 further shows a conveyor 6, on which products P are transferred through the transmitter coil 21 and the receiver coils 22, 23.

Figure 2:
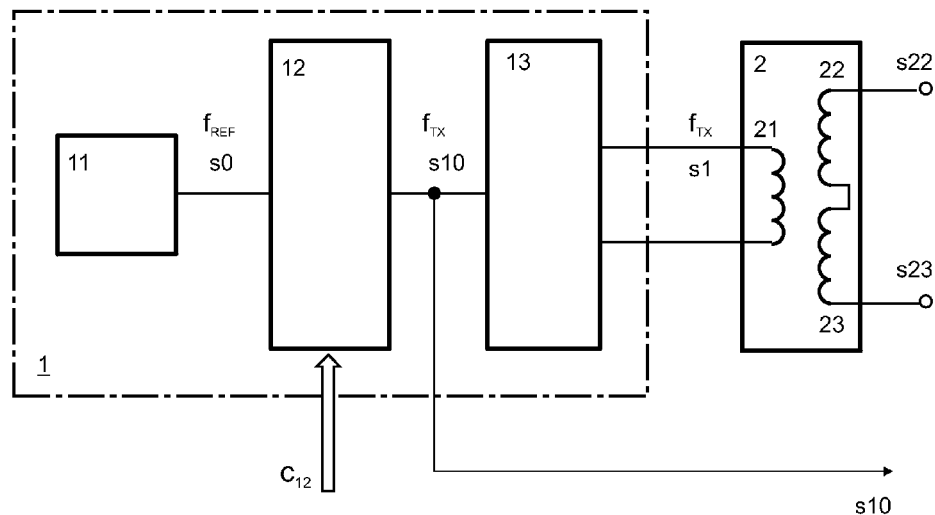
FIG. 2 shows the transmitter stage of an exemplary embodiment of a metal detection system.

The transmitter unit 1, for which an exemplary embodiment is shown in detail in FIG. 2, provides a transmitter signal s1 to the transmitter coil 21 of the balanced coil system 2. Further, the transmitter unit 1 provides a reference signal s10 having the transmitter frequency $f_{TX}$ to the receiver unit 3.

In an exemplary embodiment, the transmitter signal s1 induces signals s22, s23 in the identical receiver coils 22, 23 that are of the same magnitude but inverse polarity as long as the system is in balance, i.e., as long as the conveyed products P are not influencing the magnetic field themselves and are not contaminated with metals.

In the event that a product PC is contaminated with an electro-conductive object, then the signals s22, s23 in the identical receiver coils 22, 23 will change while that product $P_C$ passes through the balanced coil system 2. As a result, the transmitter frequency $f_{TX}$ induced in the receiver coils 22, 23 gets modulated with a baseband signal, whose amplitude and frequency are dependent on the property, dimension, and travelling speed of the electro-conductive object.

The output signals s22 and s23 of the receiver coils 22, 23 are applied to center-tapped primary windings of a balanced transformer 31 that mirror the receiver coils 22, 23. Further, the balanced transformer 31 comprises two identical center-tapped secondary windings whose opposite tails are connected to an amplifier 32. The outputs of the amplifier 32 are connected to a filter unit 33, which provides the amplified and filtered signals to a demodulation unit 34, which provides at its outputs the in-phase and quadrature components of the demodulated monitoring signal s30 and in-phase and quadrature components of the baseband signal, which originates from the conveyed products P.

The in-phase and quadrature signals provided at the outputs of the demodulation unit 34 are forwarded to a further filter unit 35, which allows the desired signals to pass through to a gain unit 36 that allows setting the amplitudes of the processed signals to a desired value. Subsequently, the filtered and calibrated signals are converted in an analog to digital converter 37 from analog form to digital form. The output signals of the analog to digital converter 37 are forwarded to a signal processing unit, such as a known digital signal processor 4, which compares the demodulated and processed monitoring signals with reference values. The data resulting from the evaluation process is then forwarded to a data processing unit such as the central processing unit of the metal detection system, e.g., an internal or external control unit such as a computer terminal 5.

In an exemplary embodiment in order to control the measurement process, the signal processor 4 or the control unit 5 may be capable of controlling the functions of the various modules provided in the transmitter unit 1 and in the receiver unit 3. For this purpose, the signal processor 4 may forward a first control signal c32 to the amplifier unit 32, a second control signal c33 to the first filter unit 33, a third control signal c35 to the second filter unit 35, a fourth control signal c36 to the gain unit 36 and a fifth control signal c37 to the analog to digital converter 37. With these control signals c32, c33, c35, c36, and c37, the amplification and filter characteristics in the individual receiver units 32, 33, 35, 36, and 37 may be selected or adjusted. A sixth control signal c12 may be forwarded to the transmitter unit 1 as described below.

The receiver stage 3 described above is of course an exemplary embodiment. For instance, an exemplary method may be implemented in metal detection systems that use differently structured receivers 3.

FIG. 2 shows a block diagram of the transmitter unit 1 of the metal detection system shown in the example of FIG. 1.

The transmitter unit 1 comprises a reference unit 11 that provides a reference signal s0 with a reference frequency $f_{REF}$ to a signal source 12, such as a frequency synthesizer 12 that is controlled by the sixth control signal c12 received from the signal processor 4 or the control unit 5. The signal processor 4 may therefore select a suitable transmitter frequency $f_{TX}$ that is forwarded with signal s10 to a power amplifier 13, which may provide the amplified transmitter signal s1 to the transmitter coil 21 of the balanced coil system 2. In this example, signal s10 is also forwarded to a module 38 in the receiver stage 3 that provides in-phase and quadrature components of the reference signal s10 to the demodulation unit 34.

The exemplary metal detection system described above allows measurement of products and contaminants with the application of various transmitter frequencies $f_{TX}$ that are selected according to an exemplary embodiment of the method. An exemplary embodiment of the method may be implemented by means of a computer system/program (see FIG. 4) that may be provided or stored preferably in the signal processor 4 or the control unit 5. An example of a computer system may comprise any suitable processor that is adapted to implement a computer program. Modules of the computer system/program may also be implemented in distributed processors.

Figure 3A:
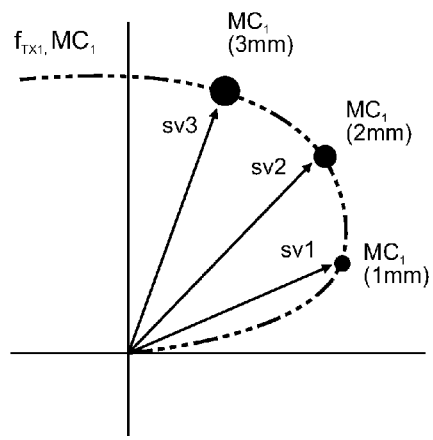
FIG. 3a shows an example of a curve or response locus established for a first metal contaminant $MC_1$ for a transmitter frequency $f_{TX1}$ that is used as a fixed parameter and with the particle size as a variable parameter.

FIG. 3a shows an example of a curve or response locus established for a first metal contaminant $MC_1$ for a transmitter frequency $f_{TX1}$, which is used as a fixed parameter, and with the particle size of the first metal contaminant $MC_1$ as a variable parameter. This curve may be obtained in various ways. With one method, the operator sequentially transfers metal particles of steadily increasing sizes, e.g., 1 mm, 2 mm, 3 mm, . . . , through the balanced coil system 20 and records the related signal vectors sv1, sv2, sv3. By connecting the endpoints of the signal vectors sv1, sv2, sv3, a program module may construct the related curve. In the event that only a small number of signal vectors sv1, sv2, sv3, have been recorded, then the line sections between two points may be obtained by interpolation. In the event that the typical progression of such a curve or the characteristics have been recorded for the metal contaminants MC, then it may be sufficient to measure only one or two signal vectors sv1, sv2, and to construct the curve based on empirical values. In the event that the metal detection system has not changed its status and a calibration is not required, then the pre-stored curves for one or more potential metal contaminant types $MC_1$, $MC_2$, $MC_3$, . . . may be downloaded from memory.

Figure 3B:
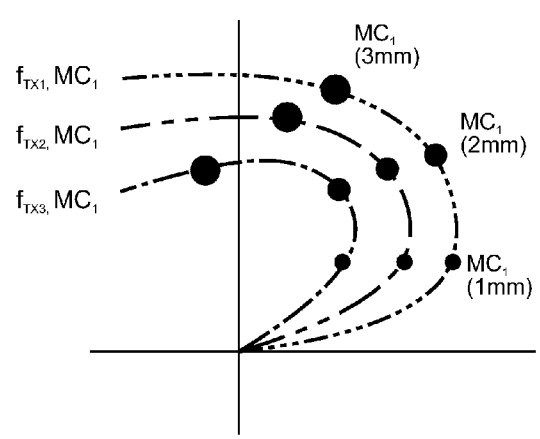
FIG. 3b shows an example of a first array of curves established for the first metal contaminant $MC_1$ for three different transmitter frequencies $f_{TX1}$, $f_{TX2}$, $f_{TX3}$.

FIG. 3b shows an example of a first array of curves established for the first metal contaminant $MC_1$ for three different transmitter frequencies $f_{TX1}$, $f_{TX2}$, $f_{TX3}$. The curves may again be obtained by measuring the signal vectors for different sizes of the metal contaminant $MC_1$ for each of the frequencies $f_{TX1}$, $f_{TX2}$, $f_{TX3}$. Alternatively, the curves may be obtained by taking one measurement only, e.g., for a particle size of 2 mm at the transmitter frequency $f_{TX2}$ and by applying empirical data.

FIG. 3c shows an example of a second array of curves established for three different metal contaminant types $MC_1$, $MC_2$, $MC_3$ for one transmitter frequency $f_{TX1}$. The curves were established as described above for FIGS. 3a and 3b.

FIG. 3d shows an area $A_{PS}$ of the product signals that may be established while scanning a product P with the transmitter frequency $f_{TX1}$. The product signals are represented by signal vectors of different phases and amplitudes that define the envelope of the area $A_{PS}$ of the product signals. Further shown are discriminator lines D that delimit the area $A_{PS}$ of the product signals, which may be suppressed or blanked by the computer system/program 50 (see FIG. 4) provided in the signal processing unit 4 and/or the control unit 5. In an exemplary embodiment, modules of the computer program/system 50 that relate to the control of the acquisition of calibration data may be implemented in the control unit 5, while modules of the computer program/system 50 that relate to the processing of signals, particularly the suppression of unwanted signals, may be implemented in the signal processing unit 4.

The area $A_{PS}$ of the product signals may be suppressed, for example, by means of adjusting the product phase until the discriminator lines D enclose the measured product signal. In an exemplary embodiment, signals of the metal contaminants $MC_1$, $MC_2$, $MC_3$, . . . that extend beyond the discriminator lines D may then be detected, while product signals may be suppressed. However, it is understood that there are other options of suppressing unwanted signals. For example, the received signals may be mapped into a two-dimensional or three-dimensional representation, in which areas or volumes are defined, that may then be suppressed. Signals that lie within this area or volume may be disregarded.

FIG. 3e shows an example of a superposition of the second array of curves shown in FIG. 3c and the area $A_{PS}$ of the product signals shown in FIG. 3d. In this illustration, it may be seen that only small sections of the curves of the first and the second metal contaminant $MC_1$, $MC_2$ lie inside the area $A_{PS}$ of the product signals. Hence, for this transmitter frequency $f_{TX1}$, this exemplary embodiment of the metal detection system is capable of detecting particles of the first and the second metal contaminant $MC_1$, $MC_2$ that are significantly smaller than 1 mm. However, it is shown that for the third metal contaminant $MC_3$, a large part of the curve, including the point that relates to a particle size of 1 mm, lies within the area $A_{PS}$ of the product signals.

In FIG. 3e, an example of the intersection points $IP_{MC1}$, $IP_{MC2}$, $IP_{MC3}$ of the discriminator lines and the curves of the metal contaminant types $MC_1$, $MC_2$, $MC_3$, that form a second array are shown. These intersection points $IP_{MC1}$, $IP_{MC2}$, $IP_{MC3}$ indicate particle sizes of the metal contaminant types $MC_1$, $MC_2$, $MC_3$ that may no longer be measured in this example. However, the comparison of the intersection points $IP_{MC1}$, $IP_{MC2}$, $IP_{MC3}$ obtained at least with a first and a second transmitter frequency $f_{TX1}$, $f_{TX2}$ allows it to be determined with which transmitter frequency $f_{TX1}$ or $f_{TX2}$ smaller particle sizes of the metal contaminant types $MC_1$, $MC_2$, $MC_3$ of interest may be measured. Based on the gathered data, as shown in the example of FIG. 3e, the computer system/program 50 may therefore decide, which transmitter frequencies $f_{TX1}$, $f_{TX2}$, . . . shall be applied. In the given example, the computer system/program 50 may decide that for the metal contaminant types $MC_1$ and $MC_2$ the first transmitter frequency $f_{TX1}$ is suitable, while for the third metal contaminant $MC_3$ another transmitter frequency $f_{TX-x}$ may provide better results.

In the event that the area $A_{PS}$ of the product signals has accurately been mapped, then the intersection points of the boundary of the area $A_{PS}$ of the product signals and the curves of the metal contaminant types $MC_1$, $MC_2$, $MC_3$, that form a second array, may be determined.

When scanning a product P, the computer system/program 50 may alternately or simultaneously apply the selected transmitter frequencies $f_{TX1}$ and $f_{TX-x}$. In one exemplary embodiment, in the event that the transmitter frequencies $f_{TX1}$ and $f_{TX-x}$ are alternately applied, then the sequence of application is preferably selected or selectable according to one or more of the process parameters. The number of alternations may typically depend on the size of the products P and the metal contaminant types MC and may freely be selected. Typically, in an exemplary embodiment, the number of the alternations is selected in the range between 1 and 50.

In the event that the first of two metal contaminants $MC_1$, $MC_2$ would provide a strong signal and the second would provide a small signal, then the duty cycles with which the transmitter frequencies $f_{TX1}$ and $f_{TX-x}$ are applied may advantageously be adapted. In an exemplary embodiment, the time of the application of the transmitter frequency $f_{TX}$ optimized for the second metal contaminant $MC_2$ may typically be by a factor in the range of 2 to 10 higher than the time of the application of the transmitter frequency $f_{TX}$ that has been selected for the first metal contaminant $MC_1$.

An exemplary embodiment of a method therefore allows starting the measurement processes, i.e., the process of scanning the conveyed products P with the preferred or optimized transmitter frequencies $f_{TX1}$ and $f_{TX-x}$. Hence, the time that is available for measurement, when the product P is passing the balanced coil system 2, may fully be used by applying the most preferable transmitter frequencies $f_{TX}$. All data collected therefore contributes to the final measurement results. Hence, due to the application of optimized transmitter frequencies $f_{TX}$ for a longer period of time, the resulting sensitivity for the detection of the metal contaminants MC increases significantly. Further, while at least for the initial setup of the metal detection system, additional steps may be required, the overall efforts of operating the metal detection system may be significantly reduced. A process for analyzing, evaluating, and selecting data may no longer be required with an exemplary embodiment.

Further, an exemplary method constitutes an important improvement for the simultaneous application of more than one transmitter frequency $f_{TX}$. Based on the above described calibration process, only a few transmitter frequencies $f_{TX}$ may be required for performing an optimized measurement in an exemplary embodiment. Consequently, the efforts for separating the reduced number of transmitter frequencies $f_{TX}$, e.g., by means of filter techniques implemented in the signal processor 4 or by means of switched filter banks 33 (see FIG. 1), will be relatively low in comparison to known systems.

Figure 4:
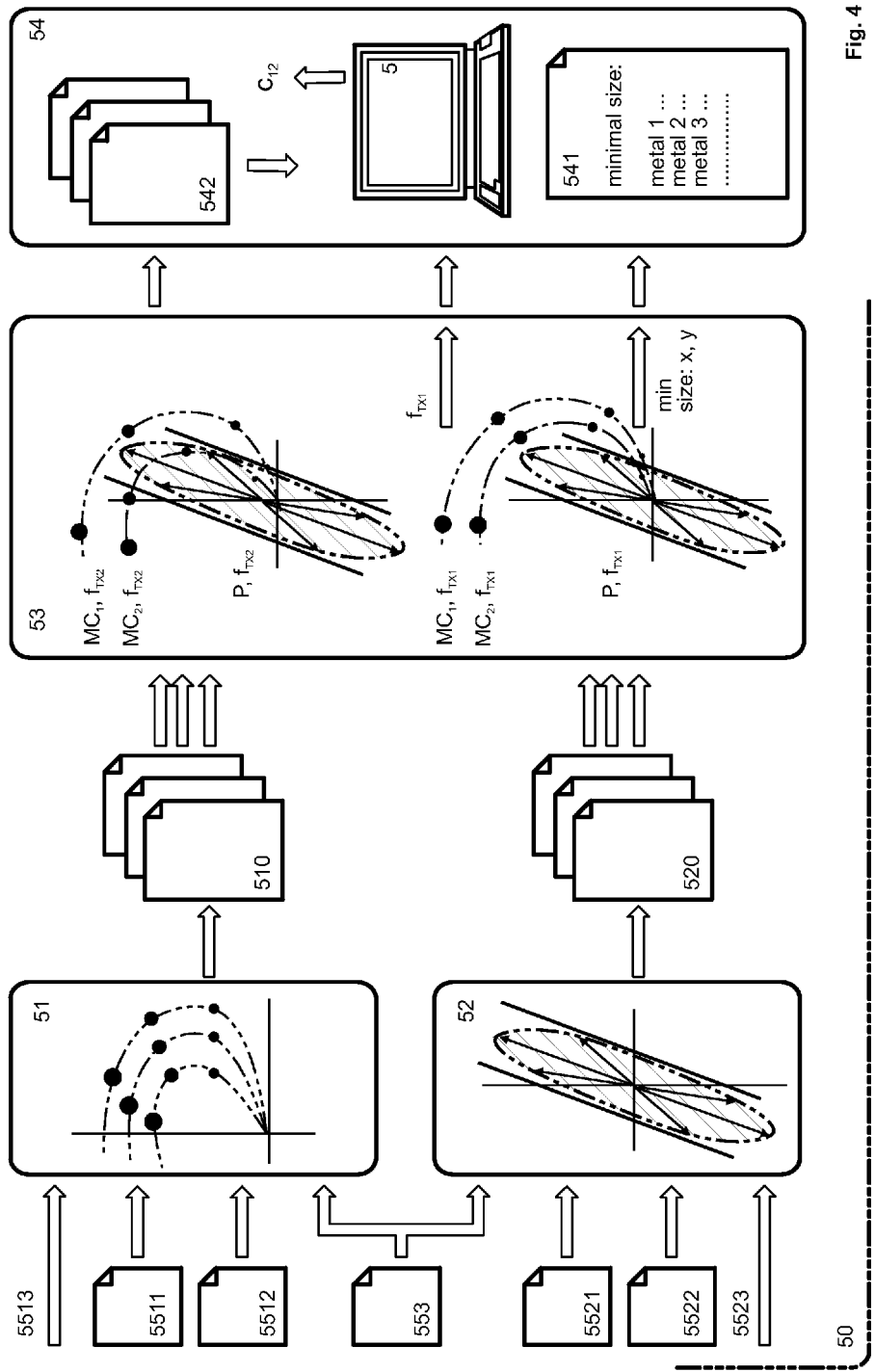
FIG. 4 shows a schematic illustration of an exemplary embodiment of a computer program 50 that may be used to implement an exemplary method.

FIG. 4 shows an illustration of an exemplary embodiment of the computer system/program 50 that may be used to implement an exemplary method. In this example, the computer system/program 50 comprises four essential modules 51, 52, 53, and 54.

In this example, the first program module 51 serves for establishing the data of metal contaminants MC that may possibly appear in the products P. More particularly, the first program module 51 serves for establishing the discussed first and/or second arrays of curves shown in FIGS. 3b and 3c. For this purpose, the first program module 51 accesses the data file 553, in which the available transmitter frequencies $f_{TX1}$, $f_{TX2}$, $f_{TX3}$, $f_{TX4}$, . . . are listed that serve as variable parameters for the first arrays and as fixed parameters for the second arrays. In an exemplary embodiment, the number of transmitter frequencies $f_{TX}$ may typically be in the range between six and twenty, but may freely be selected. In this example, the first program module 51 may access further data files 5511, 5512, . . . . In the data file 5511, empirical data of the metal contaminants MC are listed. In an exemplary embodiment, the data file 5512 preferably contains pre-recorded curves and/or first and/or second arrays of the metal contaminants MC. In the event that at least one calibration process for a metal contaminant $MC_1$ is performed, with one particle size and one transmitter frequency $f_{TX1}$, then the related data may be forwarded to the first program module 51 via the data bus 5513. The established data, such as a plurality of first and second arrays, may be forwarded in data files 510 to the third program module 53.

In this example, the second program module 52 serves for establishing data of at least one product P for the selectable transmitter frequencies $f_{TX1}$, $f_{TX2}$, $f_{TX3}$, $f_{TX4}$, . . . . The second program module 52 may access the data files 5521, 5522, . . . . The data file 5521 contains empirical data of the products P. In this embodiment, the data file 5522 preferably contains pre-recorded data of products P of interest. In the event that at least one calibration process with a product P is performed, then the related data are forwarded to the second program module 52 via the data bus 5523. The established data such as a plurality of areas $A_{PS}$, each established for a transmitter frequency $f_{TX1}, f_{TX2}, f_{TX3}, f_{TX4}, \ldots$, are forwarded in data files 520 to the third program module 53.

By selectively using the data files 5511, 5512, ...; 5521, 5522, ...; and/or concurrent data of calibration processes, the required data for the comparison processes, i.e., the evaluation of the results of the application of the transmitter frequency $f_{TX1}, f_{TX2}, f_{TX3}, f_{TX4}$ may be established in various ways.

In the third program module 53, the data established for the product P and the contaminants MC may be compared for each transmitter frequency $f_{TX1}, f_{TX2}, f_{TX3}, f_{TX4}, \ldots$. As symbolically shown in FIG. 4, superpositions of data of the product P and two contaminants $MC_1$, $MC_2$ are established for a first and a second transmitter frequency $f_{TX1}, f_{TX2}$. Then it is determined, with which transmitter frequency $f_{TX1}, f_{TX2}$ the smallest particle sizes of the contaminants $MC_1$, $MC_2$ may be detected. In an exemplary embodiment, this process is preferably performed for all selectable transmitter frequencies $f_{TX1}, f_{TX2}, f_{TX3}, f_{TX4}, \ldots$.

Finally, in an exemplary embodiment, the results of the third program module 53 are forwarded to the fourth program module 54 that controls and coordinates the individual processes, preferably including the calibration and measurement processes. Particularly, the preferred transmitter frequencies $f_{TX1}, f_{TX2}, f_{TX3}, f_{TX4}, \ldots$ and the minimum particle sizes of the metal contaminant types $MC_1$, $MC_2$, ... that may be detected therewith are reported to the fourth program module 54. Depending on configuration parameters selected by the operator, e.g., on a data terminal 5, the fourth program module 54 may set up the measurement process and forward the related control signals to the individual electronic modules of the metal detection system. In particular, the fourth program module 54 may initiate sending the control signal c12 to the transmitter unit 1. Furthermore, in an exemplary embodiment, the status of the measurement process may continuously be observed by electronic sensors, preferably optical sensors that provide signals to the fourth program module 54 allowing for timed-performed measurement sequences.

The fourth program module 54 preferably comprises data storage units, such as data files 541, 542 in which at least the results of the calibration processes are stored. In the data file 541, the results of the calibration processes, particularly the minimum particles sizes of the metal contaminant types $MC_1$, $MC_2$, ... and the related transmitter frequencies $f_{TX1}, f_{TX2}, f_{TX3}, f_{TX4}, \ldots$ may be stored. In the data file 542, configuration data for various measurement processes may be stored for repeated use.

In an exemplary embodiment, the fourth program module 54 preferably also communicates with the signal processor 4, the control unit 5, and other devices that are contained, for example, in a computer terminal.

During the operation of an exemplary embodiment of the metal detection system, the fourth program module 54 preferably collects further data derived from the product P and the metal contaminants MC in order to maintain optimal conditions with a calibration process running in parallel to the measurement process.

For the operation of an example of the metal detection system, it may be desirable to reduce the number of transmitter frequencies $f_{TX1}, f_{TX2}$ so that not for every individual product a specific frequency needs to be selected.

According to an exemplary embodiment of the invention, different products may be assigned to clusters that are assigned each to an optimized transmitter frequency $f_{TX}$. Clustering the products may therefore allow obtaining improved measurement results with high efficiency.

The process of clustering may be performed in various ways. In an exemplary embodiment, preferably the product information is still obtained for all available transmitter frequencies $f_{TX}$. As stated above, when scanning a product, typically various signal components occur, each having an individual phase and magnitude. For example, connecting the vectors of all signal components may lead to an envelope that is the boundary of the area $A_{PS}$ of the product signals or the product signature that may be suppressed by the signal discriminator.

The example of FIG. 3d shows an area $A_{PS}$ of the product signals that may be established while scanning a product P with the transmitter frequency $f_{TX1}$. The product signals are represented by signal vectors of different phases and amplitudes that define the envelope of the area $A_{PS}$ of the product signals. Further shown are discriminator lines D that delimit the area $A_{PS}$ of the product signals, which may be suppressed.

According to an exemplary embodiment of the invention, products with similar or equivalent product signatures $A_{PS}$ may be grouped and assigned to an optimized transmitter frequency $f_{TX}$. For this group or cluster, discriminator lines D may then be set, which ensure that each product signature $A_{PS}$ is suppressed, when the corresponding product is passing through the detector.

Alternatively, in an exemplary embodiment, products with discriminator lines D that lie within a selected range may be grouped for an optimized transmitter frequency $f_{TX}$.

As a further alternative, discriminator lines D may be defined, based on which stored product signatures $A_{PS}$ or stored discriminator lines D are retrieved, that lie between said discriminator lines D. The operator may therefore select acceptable particle sizes of the metal contaminant types $MC_1$, $MC_2$, $MC_3$ and corresponding discriminator lines D. For these discriminator lines D, the implemented computer system/program 50 in an exemplary embodiment may list all products that may be grouped for individual transmitter frequencies $f_{TX1}, f_{TX2}, \ldots$.

In a further exemplary embodiment, the operator may select a first product P that needs to be measured. The computer system/program 50 may then analyze if further products P exist, preferably within a selected tolerance range that may be clustered together with the first product.

In an exemplary embodiment, the reduced set of transmitter frequencies $f_{TX1}, f_{TX2}, \ldots$ preferably includes transmitter frequencies $f_{TX1}, f_{TX2}, \ldots$, which may be selected in such a way that cluster sizes are obtained containing a maximum number of products.

With this clustering process in an exemplary embodiment, which may be executed with the computer system/program 50 based on product data stored in the database 5, the efficiency of the metal detection system may significantly be increased.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. A method for operating a metal detection system that comprises a balanced coil system including a transmitter coil that is connected to a transmitter unit, which is adapted to provide transmitter signals having a selectable transmitter frequency, and a first and a second receiver coil that are adapted to provide output signals to a receiver unit, which are adapted to compensate one another in an event that the metal detection system is in balance and, in an event that a product is present in the balanced coil system, the receiver unit is adapted to provide an output signal that is forwarded to a signal processing unit, which is adapted to suppress at least components of a product signal and deliver signal components caused by metal contaminants contained in the product, comprising the following steps:
   a) for each of a plurality of metal contaminants, determining phase and magnitude of related signals for each of at least two transmitter frequencies and for at least two particle sizes of each of the metal contaminants;
   b) determining phase and magnitude of a product signal respectively for the product for the at least two transmitter frequencies;
   c) comparing information established for each of the metal contaminants and information established for the product respectively for the at least two transmitter frequencies;
   d) for each of the metal contaminants, determining a preferable transmitter frequency with which signal components for smallest sized particles of the contaminant differ most in phase and amplitude from the phase and amplitude of the product signal; and
   e) alternately applying the preferable transmitter frequency for each of the metal contaminants for measuring the product.

2. A method according to claim 1, further comprising:
   a) for each of the metal contaminants, establishing at least a first and a second curve of a first array, each curve representing the phase and magnitude of the signal for a progressively increasing particle size of the first metal contaminant for one of the transmitter frequencies; and
   b) for each of the metal contaminants, comparing information established for the metal contaminant and information established for the product respectively for each of the transmitter frequencies in order to determine the preferable transmitter frequency, for which the signal components for the smallest sized contaminant particles differ most in phase and amplitude from the phase and amplitude of the product signal.

3. A method according to claim 1, wherein:
information is established for the metal contaminants; and
curves that are established for the same transmitter frequency for different metal contaminant types are combined to form a second array.

4. A method according to claim 1, wherein at least one of the preferable transmitter frequencies is determined such that it is optimal for multiple metal contaminant types.

5. A method according to claim 1, further comprising filtering signals in a receiver stage in order to detect different metal contaminant types.

6. A method according to claim 5, wherein the preferable transmitter frequencies are applied alternately with a selectable sequence during scanning of the product.

7. A method according to claim 1, wherein the step of the information established for the product includes detection of various components of the product signals having different phases and magnitudes defining an area of the product signals.

8. A method according to claim 1, wherein:
information established for metal contaminant types and information established for products is stored in a memory unit of the metal detection system and downloaded whenever the metal detection system is set up for a new measurement process; or
the information for the metal contaminant types and for the product is established whenever the metal detection system is set up for the new measurement process.

9. A method according to claim 1, wherein at least one cluster associated with products is formed that:
   a) exhibits product areas with a predetermined maximum deviation and for which discriminator lines D are determined; or
   b) exhibits product areas lying between predetermined discriminator lines D.

10. A method according to claim 1, wherein two or more clusters associated with products are defined which are assigned to a reduced set of the transmitter frequencies.

11. A metal detection system comprising:
a balanced coil system including a transmitter coil that is connected to a transmitter unit, which is adapted to provide transmitter signals having a selectable transmitter frequency, and a first and a second receiver coil that are adapted to provide output signals to a receiver unit, which are adapted to compensate one another in an event that the metal detection system is in balance and, in an event that a product is present in the balanced coil system, the receiver unit is adapted to provide an output signal that is forwarded to a signal processing unit, which is adapted to suppress at least components of a product signal and deliver signal components caused by metal contaminants contained in the product;
a control unit including a computer system adapted:
   a) to compare information established for each of a plurality of metal contaminants for at least two transmitter frequencies and information established for the product respectively for the at least two transmitter frequencies;
   b) for each of the metal contaminants, to determine a preferable transmitter frequency with which the signal components for smallest sized particles of the contaminant differ sufficiently in phase and amplitude from phase and amplitude of the product signal; and
   c) for each of the metal contaminants, to determine a preferable transmitter frequency with which the signal components for smallest sized particles of the contaminant differ most in phase and amplitude from phase and amplitude of the product signal; and
   d) to alternately or simultaneously select the preferable transmitter frequency for each of the metal contaminants for measuring the product.

12. A metal detection system according to claim 11, wherein the computer system is adapted:
   a) for each of the metal contaminants, to establish a first array comprising at least two curves, each curve representing the phase and magnitude of the signal for a progressively increasing particle size of the metal contaminant for one of the transmitter frequencies; and
   b) for each of the metal contaminants, to compare the information established for the metal contaminant and the information established for the product respectively in order to determine the preferable transmitter frequency for which the signal components of the smallest sized contaminant particles differ most in phase and amplitude from phase and amplitude of the product signal.

13. A method for operating a metal detection system that comprises a balanced coil system including a transmitter coil that is connected to a transmitter unit, which is adapted to provide transmitter signals having a selectable transmitter frequency, and a first and a second receiver coil that are adapted to provide output signals to a receiver unit, which are adapted to compensate one another in an event that the metal detection system is in balance and, in an event that a product is present in the balanced coil system, the receiver unit is adapted to provide an output signal that is forwarded to a signal processing unit, which is adapted to suppress at least components of a product signal and deliver signal components caused by metal contaminants contained in the product, comprising the following steps:
   a) for each of a plurality of metal contaminants, determining phase and magnitude of related signals for each of at least two transmitter frequencies and for at least two particle sizes of each of the metal contaminants;
   b) determining phase and magnitude of a product signal respectively for the product for the at least two transmitter frequencies;
   c) comparing information established for each of the metal contaminants and information established for the product respectively for the at least two transmitter frequencies;
   d) for each of the metal contaminants, determining a preferable transmitter frequency with which signal components for smallest sized particles of the contaminant differ most in phase and amplitude from the phase and amplitude of the product signal; and
   e) simultaneously applying the preferable transmitter frequency for each of the metal contaminants for measuring the product.

14. A method according to claim 13, further comprising:
   a) for each of the metal contaminants, establishing at least a first and a second curve of a first array, each curve representing the phase and magnitude of the signal for a progressively increasing particle size of the metal contaminant for one of the transmitter frequencies; and
   b) for each of the metal contaminants, comparing information established for the metal contaminant and information established for the product respectively for each of the transmitter frequencies in order to determine the preferable transmitter frequency, for which the signal components for the smallest sized contaminant particles differ most in phase and amplitude from the phase and amplitude of the product signal.

15. A method according to claim 13, wherein:
information is established for the metal contaminants; and
curves that are established for the same transmitter frequency for different metal contaminant types are combined to form a second array.

16. A method according to claim 13, wherein at least one of the preferable transmitter frequencies is determined such that it is optimal for multiple metal contaminant types.

17. A method according to claim 13, further comprising filtering signals in a receiver stage in order to detect different metal contaminant types.

18. A method according to claim 13, wherein the step of the information established for the product includes detection of various components of the product signals having different phases and magnitudes defining an area of the product signals.

19. A method according to claim 13, wherein:
information established for metal contaminant types and information established for products is stored in a memory unit of the metal detection system and downloaded whenever the metal detection system is set up for a new measurement process; or
the information for the metal contaminant types and for the product is established whenever the metal detection system is set up for the new measurement process.

20. A method according to claim 13, wherein at least one cluster associated with products is formed that:
   a) exhibits product areas with a predetermined maximum deviation and for which discriminator lines D are determined; or
   b) exhibits product areas lying between predetermined discriminator lines D.

21. A method according to claim 13, wherein two or more clusters associated with products are defined which are assigned to a reduced set of the transmitter frequencies.

22. A method for operating a metal detection system that comprises a balanced coil system including a transmitter coil that is connected to a transmitter unit, which is adapted to provide transmitter signals having a selectable transmitter frequency, and a first and a second receiver coil that are adapted to provide output signals to a receiver unit, which are adapted to compensate one another in an event that the metal detection system is in balance and, in an event that a product is present in the balanced coil system, the receiver unit is adapted to provide an output signal that is forwarded to a signal processing unit, which is adapted to suppress at least components of a product signal and deliver signal components caused by metal contaminants contained in the product, comprising the following steps:
   a) determining phase and magnitude of related signals at least for a first metal contaminant for each of at least two transmitter frequencies and for at least two particle sizes of the first metal contaminant;
   b) determining phase and magnitude of a product signal respectively for the product for the at least two transmitter frequencies;
   c) comparing information established for the at least first metal contaminant and information established for the product for the at least two transmitter frequencies;
   d) determining a preferable transmitter frequency with which signal components of smallest sized particles of the at least first contaminant differ most in phase and amplitude from the phase and amplitude of the product signal; and
   e) selecting the preferable transmitter frequency for measuring the product; wherein two or more clusters associated with products are defined which are assigned to a reduced set of the transmitter frequencies.

* * * * *